Patented Nov. 4, 1924.

1,513,794

UNITED STATES PATENT OFFICE.

FRANK J. BAUMGARDNER, OF CLEVELAND, OHIO, ASSIGNOR OF ONE-HALF TO FRANK L. PHIPPS, OF CLEVELAND, OHIO.

COATING COMPOSITION.

No Drawing.     Application filed August 5, 1918. Serial No. 248,253.

*To all whom it may concern:*

Be it known that I, FRANK J. BAUMGARDNER, a citizen of the United States, residing at Cleveland, in the county of Cuyahoga and State of Ohio, have invented certain new and useful Improvements in Coating Compositions, of which the following is a specification.

My invention relates to improvements in coating compositions, and more particularly to that class known as "liquid coating compositions,"—such as paints, enamels, and the like, the improved coating composition embodying a body material or filler which I have discovered may be used as a substitute for and in fact as an improvement on various extensively employed chemical elements and substances now used in the manufacture of paints and varnishes.

My invention further relates to what may be termed a "base" or "pigment" for paints, enamels, and the like, the improved material preferably comprising finely divided or pulverized oyster shells which I have discovered may be used not only as a substitute for, but in fact as an improvement on white lead, zinc oxide, lithopone, and analogous materials now frequently and extensively employed in the manufacture of various paints and enamels.

While I prefer to use pulverized or ground oyster shells, under certain circumstances and for certain purposes I may also use the shells of clams, mussels, and the like, of the salt-water variety, of the group of "mollusks" known as "bivalves" so that by the term "mollusks," as hereinafter used, I mean to include clams, oysters, and mussels of the salt-water class, it being found that the shells of clams and mussels of the fresh-water variety are not adapted for use as a filler or base for the purposes herein referred to.

I have discovered that finely divided or pulverized mollusk shells of the salt-water variety, such for example,—as oyster shells,—are admirably adapted as a substitute for and an improvement on such commonly employed substances now used in the manufacture of paint, enamel, and the like, and that such ground oyster shells may not only be used as a substitute for such substances without sacrificing any of the necessary or desirable qualities or properties of the particular coating composition, but that such ground shell or filler material has a marked superiority over such commonly employed filler or base materials in that it has no acid reaction against the coloring materials and therefore requires less coloring material to produce a given tint, such oyster or mollusk shell base being what may be termed neutral with respect to the action of the coloring materials.

Furthermore, I have discovered that my improved filler or base material is not only better held in suspension in the paint vehicle, but requires less drier than the above mentioned commonly employed filler or base materials. Furthermore, my improved base or pigment is non-poisonous in its composition, is entirely free from acid, and does not throw off noxious odors.

The shells are reduced to a finely divided condition by grinding or pulverizing in a suitable mill or crusher for this purpose, the degree of fineness being, of course, governed by the requirements to be met by the particular coating composition. Ordinarily the shells should be ground sufficiently fine to pass through a sieve of one hundred and fifty (150) to two hundred (200) mesh screen. When oyster shells are thus reduced the product is a white mass similar to ordinary white lead in general appearance having all the advantages thereof and eliminating the objectionable features above mentioned.

It should be understood that the pulverized mollusk shells of the salt-water variety, particularly such as oyster shells,—may not only be used as a substitute for and improvement on white lead, zinc oxide, lithopone, and the like, in connection with the preparation or manufacture of liquid coating composition such as paints, enamels, and the like, but under certain circumstances may be incorporated with such base substances in suitable proportions, resulting in the paint or enamel not only being greatly improved in quality, but being much more economically produced, particularly since the shells mentioned are comparatively inexpensive and are now practically waste material.

As applied to or used in the manufacture of paints, the latter may be prepared in any suitable or conventional manner and the ingredients and substances may be varied in number and proportions in accordance with the requirements to be met in the particular paint to be produced. Any suitable and convenient paint vehicle such as linseed oil, cottonseed oil, or the like, may be employed, and if a drier be required any suitable drier such as japan drier, turpentine drier, litharge, or other suitable drier substances having the function desired may be employed. A good white paint may be produced by simply incorporating and mixing the prepared or pulverized shells with a suitable paint vehicle and a drier in substantially the proportions where white lead is now incorporated with such paint vehicle and drier, or if desired the proportions of ground shells may be reduced and zinc oxide or lithopone, or both, may be added. A paint having this ground shell filler or base produces a perfectly glossed or varnished finish without the use of varnish thus resulting in a further advantage and economy in use.

Where a colored paint is desired the ground or pulverized shells may be incorporated with the paint vehicle and any suitable and convenient coloring matter adapted to produce the desired color may be incorporated.

A paint particularly designed and adapted for coating metal surfaces may be prepared by mixing ground oyster shells, zinc oxide, boiled linseed oil, japan drier and turpentine. A paint prepared in a conventional manner with the above ingredients is adapted to withstand considerable heat without effecting the coating, and I have found that a paint having a filler or base of such ground shells is particular immune to the action of sea or salt-water, such shell base being particularly adapted to resist the action of such water and to preserve metal such as iron and steel from deterioration, oxidation, corrosion, or the like.

The following substances when properly mixed and combined in the following proportions will give excellent results:

| | |
|---|---|
| Powdered oyster shells | 30 parts. |
| Zinc oxide | 1½ parts. |
| Boiled linseed oil | 12 parts. |
| Japan drier | 2 parts. |
| Turpentine | 6 parts. |

Having thus described my improved coating composition or new base or pigment material, without having attempted to set forth all the forms in which it may be made, or all the proportions, modes, or applications of its use, what I claim and desire to secure by Letters Patent, is,—

1. A new liquid coating composition, comprising pulverized oyster shells, and a paint vehicle.

2. A new liquid coating composition, comprising pulverized oyster shells, a paint vehicle, and zinc oxide.

3. A liquid coating composition, comprising finely divided salt-water mollusk shells, zinc oxide, a drier, and a paint vehicle.

In testimony whereof I have affixed my signature in the presence of two witnesses.

FRANK J. BAUMGARDNER.

Witnesses:
F. L. PHIPPS,
O. C. BILLMAN.